(12) United States Patent
Tsai et al.

(10) Patent No.: US 6,206,022 B1
(45) Date of Patent: Mar. 27, 2001

(54) INTEGRATED FLOW CONTROLLER MODULE

(75) Inventors: Ming-Jye Tsai; Yue-Min Wan; Chun-Hsu Ke; Ruei-Hung Jang; Ching-Yi Wu; Raey-Shing Huang; Cheng-Jien Peng, all of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/480,997

(22) Filed: Jan. 11, 2000

Related U.S. Application Data

(62) Division of application No. 09/182,679, filed on Oct. 30, 1998, now Pat. No. 6,032,689.

(51) Int. Cl.$^7$ .................................................. G05D 7/06
(52) U.S. Cl. ........................ 137/15.18; 137/486; 251/11
(58) Field of Search .......................... 137/486, 15.18; 251/11

(56) References Cited

U.S. PATENT DOCUMENTS

| | | | |
|---|---|---|---|
| 4,821,997 | * 4/1989 | Zdeblick | 251/11 |
| 5,029,805 | * 7/1991 | Albarda et al. | 251/11 |
| 5,529,279 | * 6/1996 | Beatty et al. | 251/11 |
| 5,785,295 | * 7/1998 | Tsai | 251/11 |
| 5,975,485 | * 11/1999 | Tsai et al. | 251/11 |

* cited by examiner

Primary Examiner—Gerald A. Michalsky
(74) Attorney, Agent, or Firm—Bacon & Thomas

(57) ABSTRACT

A flow controller module comprising at least one micro flow sensor and a microvalve, integrated in a micro flow channel, is disclosed. The micro flow sensor comprises a pressure sensitive flow sensor. At the position of the micro flow sensor, the micro flow channel is provided with an orifice so that pressure of a flow may be enlarged to facilitate measurement of the flow speed. The microvalve comprises a silicon microbridge with a mesa structure and is driven by a voltage. The microvalve may operate under a normally closed mode or a normally open mode. Disclosed in this invention is also a flow sensor suited in the integrated flow controller module. Methods for preparing the flow sensor and the flow controller module are also disclosed.

4 Claims, 5 Drawing Sheets

US 6,206,022 B1

INTEGRATED FLOW CONTROLLER MODULE

This application is a divisional application of U.S. application Ser. No. 09/182,679 filed Oct. 30, 1998, now U.S. Pat. No. 6,032,689.

FIELD OF THE INVENTION

The present invention relates to an integrated flow controller module, especially to an integrated flow sensor module comprising a pressure sensitive flow sensor.

BACKGROUND OF THE INVENTION

Due to the developments in the micro machining technology, a micro flow controller module comprising a plurality of sensors, actuators and control circuits may be integrated in one single dice. An integrated micro flow controller prepared with the micro machining technology is capable of measuring and controlling flows within a microchannel. When the flow to be measured and controlled is a gaseous flow, the applicable velocity may be under 1/min. For a liquid flow, the applicable velocity may be at the scale of μl/min. The geometric scale of a flow controller is centimeter. The advantages of the integrated micro flow controller include energy saving, short response time and compactness. Micro flow controllers may further be associated in matrix to precisely control flows in a larger scale.

A micro flow controller module generally includes a flow sensor to measure the velocity of a flow, a microvalve to control the velocity and a system controller circuit to control the operation of the microvalve. In the conventional art, the microvalve may be an electromagnetic or a piezoelectric valve. The flow sensor may be a wicked thermal flow sensor. Due to the numbers and volumes of the components, volume of a micro flow controller is always bulky. In addition, these components must be prepared and assembled under superfine processes and packaged mechanically. As a result, manufacture costs of the micro flow controller may not be reduced.

It is thus a need in the industry to have an integrated flow controller where a flow sensor and a microvalve are integrated in one single dice. It is also a need to have a compact flow controller module that may be prepared under the semiconductor manufacture process.

OBJECTIVES OF THE INVENTION

The purpose of this invention is to provide an integrated flow controller module where a flow sensor and a microvalve are integrated in one single dice.

Another purpose of this invention is to provide an integrated flow controller module that may be prepared under the semiconductor manufacture process.

Another purpose of this invention is to provide a simplified, compact and reliable micro flow controller module.

Another purpose of this invention is to provide an integrated micro flow controller module comprising a pressure sensitive flow sensor.

Another purpose of this invention is to provide a micro flow sensor suited in the above integrated flow controller modules.

Another purpose of this invention is to provide methods for the preparation of the above integrated micro flow controller module and its micro flow sensors.

SUMMARY OF THE INVENTION

According to the present invention, an integrated flow controller module comprising at least one micro flow sensor and a microvalve is disclosed. The micro flow sensor and the microvalve are integrated in a micro flow channel. The micro flow sensor comprises a pressure sensitive flow sensor. The micro flow channel is provided with an orifice adjacent to the flow sensor to enlarge the pressure of a flow to be measured. The microvalve comprises a silicon microbridge with a mesa structure and is driven by a voltage. The microvalve may operate under a normally closed mode or a normally open mode.

These and other objectives and purposes may be clearly understood from the detailed description of the invention by referring to the following drawings.

IN THE DRAWINGS

DETAILED DESCRIPTION OF THE INVENTION

The integrated flow controller module of this invention comprises a flow channel, a proportional microvalve and a flow sensor, all integrated in one single dice. A fluid may be introduced into the flow channel from an inlet. A pressure sensitive flow sensor comprising a pressure sensitive resistor or a pressure sensitive capacitor is positioned at a measuring area of tile flow channel. An orifice is preferably provided at the measuring area of the flow channel. In some embodiments of this invention, a flow controller module has more than one flow sensor and corresponding number of orifices. Velocity of the fluid flow is measured at the measuring area(s) and the velocity is converted into an electric signal. The fluid is then introduced into a microvalve area provided with a microvalve. The microvalve comprises a silicon microbridge with a mesa structure and operates under a normally closed mode or a normally open mode. A controller controls the operations of the microvalve based on the velocity of the fluid flow.

Description of the embodiments of the integrated flow controller module will be given in the followings.

EMBODIMENT 1

Figure 1:
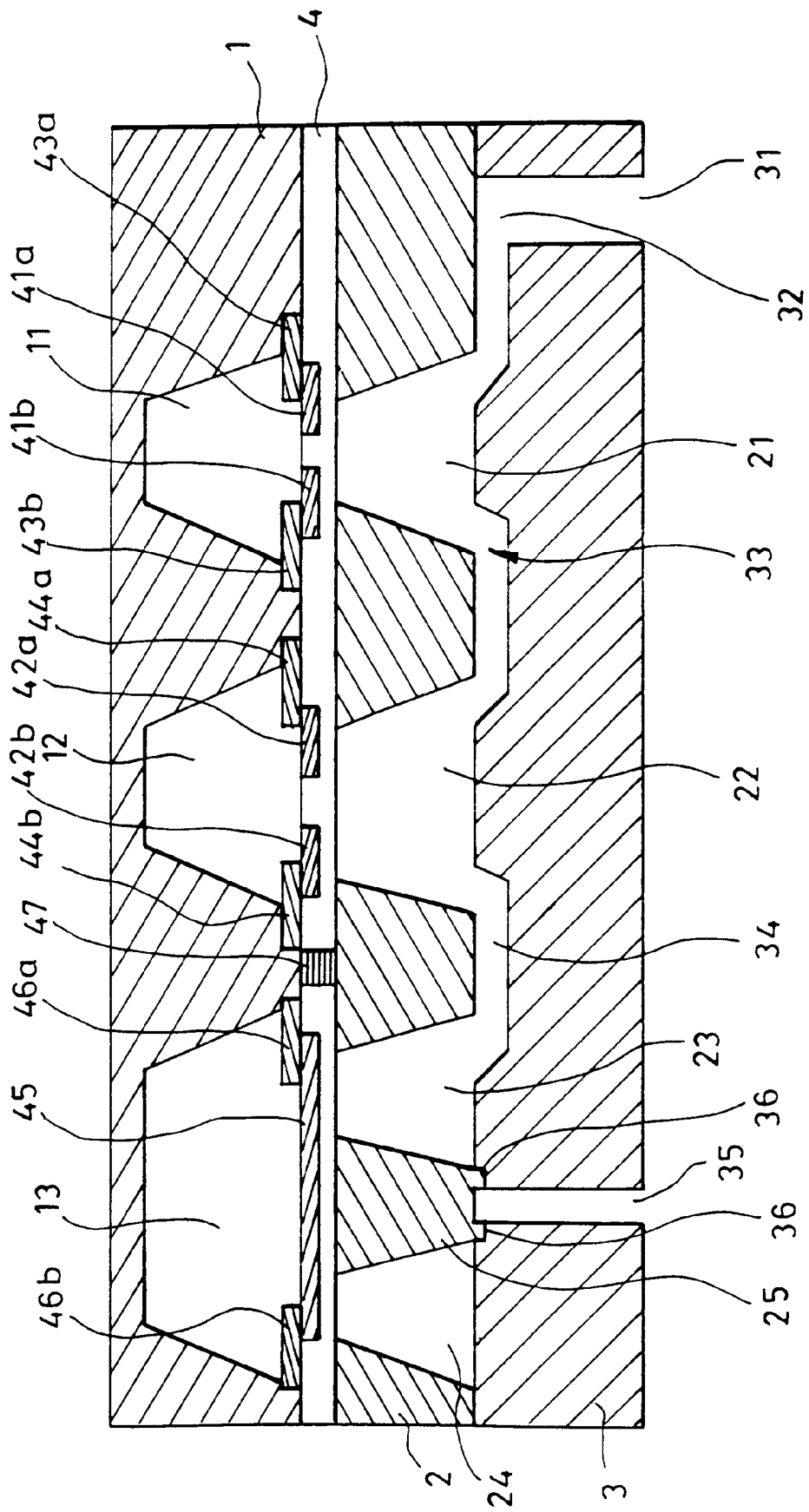
FIG. 1 illustrates the sectional view of the first embodiment of the integrated flow controller module of the invention.

FIG. 1 illustrates the sectional view of the first embodiment of the integrated flow controller module of the invention. As shown in this figure, the integrated flow controller module of this embodiment has a three-layer structure. Among them, the upper layer 1 is prepared with a silicon material, or any other suited material. The upper layer 1 comprises 3 cavities: first pressure cavity 11 and second pressure cavity 12 respectively provide pressure adjustments P1 and P2 to adjust the pressure of the flow to be measured and controlled. Values of the pressure adjustments P1 and P2 may be decided according to the measurable scope of the velocity, such that the measurable scope of the velocity may be wide. The third pressure cavity 13 provides pressure adjustment P3 to microvalve (to be described hereinafter), so that the applicable velocities of the flow controller may be adjusted.

The middle layer 2 comprises a measuring area and a microvalve area. Material for the middle layer 2 may be silicon or other suited materials. Orifices 21 and 22 are provided at positions corresponding to the first pressure cavity 11 and the second pressure cavity 12, respectively. Although it is not intended to limit the scope of this invention, the purpose of the orifices 21 and 22 is to enlarge pressure differences of the flow so to improve the precision of measurement. Cavities 23 and 24 are provided beneath the third pressure cavity 13. Between cavities 23 and 24 is a mesa structure 25 to function as a microvalve. In the embodiments of this invention, the mesa structure 25 is the non-etched area of the middle layer 2. In other embodiments, the mesa structure 25 is prepared separately.

Between the upper layer 1 and the middle layer 2 is an EPI layer 4. The EPI layer 4 functions as a membrane to provide elastic sustention in response to pressure of the flow. 4 impurity layers 41a, 41b, 41c and 41d are formed under first and second pressure cavities 11 and 12, respectively, to function as pressure-sensitive resistors. Coupling with said resistors 41a, 41b, 41c and 41d are electrodes 43a, 43b, 44a and 44b. When variations of fluid pressure occur in orifices 21 and 22, voltages of electrodes 43a, 43b, 44a and 44b will vary due to variations in resistance at resistors 41a, 41b, 41c and 41d. With this, velocity of the flow may be measured by a microprocessor (not shown) according to the conventional technology.

In this figure, two orifices are used to generate flow pressure signals so that the signals may be calibrated. It is however possible to use only one or more than two orifices to generate flow pressure signals.

The above may be thus called a "measuring area", since velocity of the flow is measured in this area.

In the other side of the middle layer 2 is a microvalve area. Between the mesa structure 25 and the third pressure cavity 13 is also an EPI membrane 4. The EPI membrane in the microvalve area may be the continuation of that in the measuring area. Preferably, an insulator 47 is provided between these two sections. Above the mesa structure 25, an impurity layer 45 is formed on the EPI membrane 4. Coupling with the impurity layer 45 are electrodes 46a and 46b. The pattern of the impurity layer 45 may be tortuous, circular or other suited patterns. The EPI membrane 4 provides an elastic sustention to support the mesa structure 25. When an external voltage is applied to electrodes 46a and 46b, thermal dissipation will occur in impurity layer 45 so that EPI membrane 4 will be deformed and bend upward. Because of this driving force, the mesa structure 25 is moved upward such that its bottom does not butt against the lower layer 3. An opening between the mesa structure 25 and the lower layer 3 allows fluid to flow through.

As the upward movement of the mesa structure 25 is in a proportional relation with the voltage supplied to electrode 46a and 46b, the velocity of the flow may thus be controlled. The mesa structure 25 thus functions as a microvalve. Other microvalves that controls fluid velocities by an active driving force and may be integrated with a flow sensor in one single dice may also be applicable in this invention.

The lower layer 3 comprises an inlet, an outlet and a channel for a the flow to be measured and controlled. In this embodiment, lower layer 3 is made of silicon material. Other material may also be used to prepare the lower layer 3. In lower layer 3, 31 is a flow inlet, 32 is entrance for the first orifice 21, 33 is connection channel between first and second orifice 21 and 22, 34 is connection channel between second orifice 22 and cavity 23, 35 is outlet of the channel. Two extruders 36, 36 are provided at outlet 35 to ensure the blockage of the flow by the mesa structure 25. Extruders 36, 36 may be prepared with a material same as that of lower layer 3. Other materials may also be used to prepare extruders 36, 36.

Figure 2:
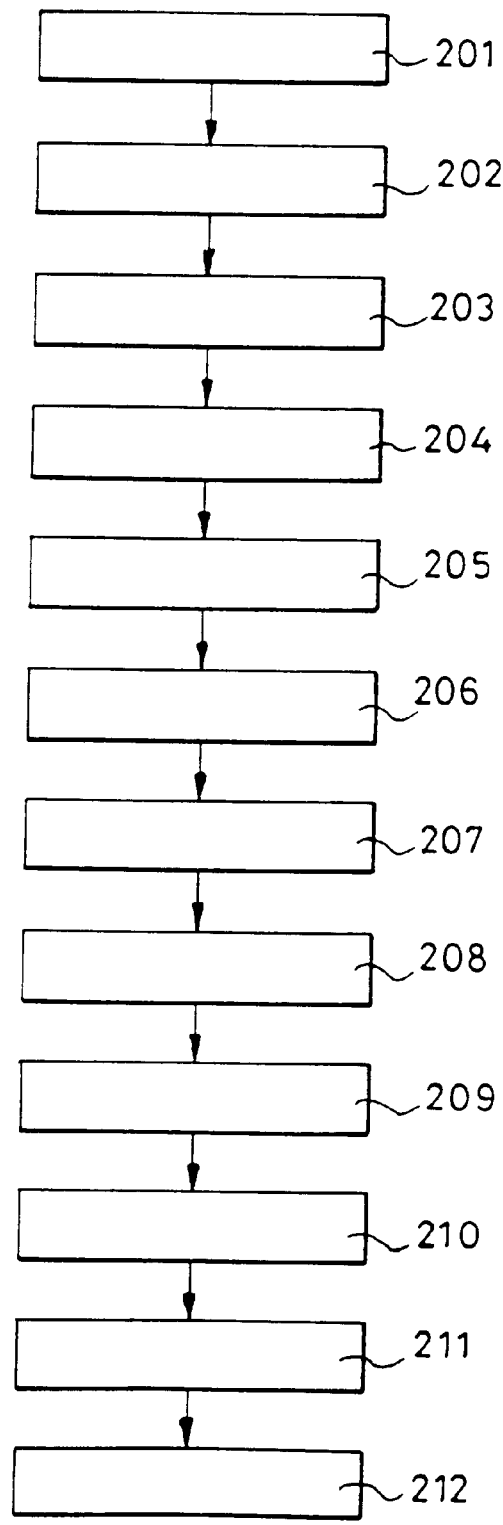
FIG. 2 illustrates the flow chart for the preparation of the integrated flow controller module of FIG. 1.

Preparation of the integrated flow controller module of this embodiment will be given in the followings. FIG. 2 illustrates the flow chart for the preparation of the integrated flow controller module of FIG. 1. As shown in this figure, in the preparation of a micro flow controller, a silicon substrate is prepared at 201 as the lower layer 3. At 202 etch the substrate 3 to form an inlet 31, an outlet 35, entrance 32, connection channels 33 and 34, and extruders 36, 36.

At 203 a sacrificial layer (not shown) is formed on the substrate 3. At 204 a middle layer 2 is formed on the sacrificial layer 2. At 205, etch the assembly to form a first orifice 21, a second orifice 22 and cavities 23 and 24, while a mesa structure 25 is reserved. During the etching, areas of the sacrificial layer above inlet 31, entrance 32, connection channels 33 and 34 and outlet 35, shall be etched off so that the channel is formed.

Thereafter, at 206 an EPI layer 4 is formed on the middle layer 2. At 207 impurities are planted into the EPI layer 4 to form impurity layers 41a, 41b, 42a, 42b and 45. If necessary, at 208 an insulator 47 is prepared in the EPI layer 4, between the measuring area and the microvalve area.

Later, at 209 electrodes 43a, 43b, 44a, 44b and 46, 46 are bonded onto purity layers 41a, 41b, 42a, 42b and 45. Suited materials for electrodes include aluminum, molybdenum, tungsten or other suited metal or metal alloys. The electrodes may be evaporated or bonded. At 210 an upper layer 1 is formed on the EPI layer 4. Suited materials for the upper layer 1 include silicon, glass or high molecular materials. At 211 a first pressure cavity 11, a second pressure cavity 22 and a third pressure cavity 23 are formed in the upper layer 1 by etching the upper layer 1. Finally, at 212, a coating layer (not shown) is formed on the upper layer 1 and an integrated flow controller module is accomplished. Here, material of the coating layer may be the same as that of the upper layer.

In the preparation of the upper layer 1, the cavities 11, 12 and 13 may be etched through a sacrificial layer. The upper layer 1 may also be prepared with cavities 11, 12 and 13, and then bonded to the EPI layer 4.

When the integrated micro flow sensor is applied to control the velocity of a fluid, the fluid is introduced into the first orifice 21 through inlet 31 and entrance 32. The fluid then enters the second orifice 22 through connection channel 33. Pressure of the fluid is transferred to impurity layers 41a, 41b, 42a and 42b so that resistance values of impurity layers 41a, 41b, 42a and 42b vary. In this embodiment, EPI layer 4 is N pole and electrodes 43a, 43b, 44a and 44b are connected in parallel. Variations of voltage at electrodes 43a, 43b, 44a and 44b are measured by a microprocessor (not shown) and velocity of the flow is obtained. Any conventional art may be applied to convert the voltage variations into velocity of the fluid flow. Description thereof is thus omitted.

While the velocity of the flow is measured, microprocessor generates velocity control signals according to a predetermine regulation, and outputs the signals to electrode 46, 46. Thermal dissipation occurred in impurity layer 45 drives EPI layer 4 to bend upward so that mesa structure 36 is moved upward for a certain distance. An opening between the mesa structure 36 and the lower layer 3 allows the fluid to flow to outlet 35. The sectional area of the opening may be decided by the voltage supplied to electrodes 46, 46.

EMBODIMENT 2

Figure 3:
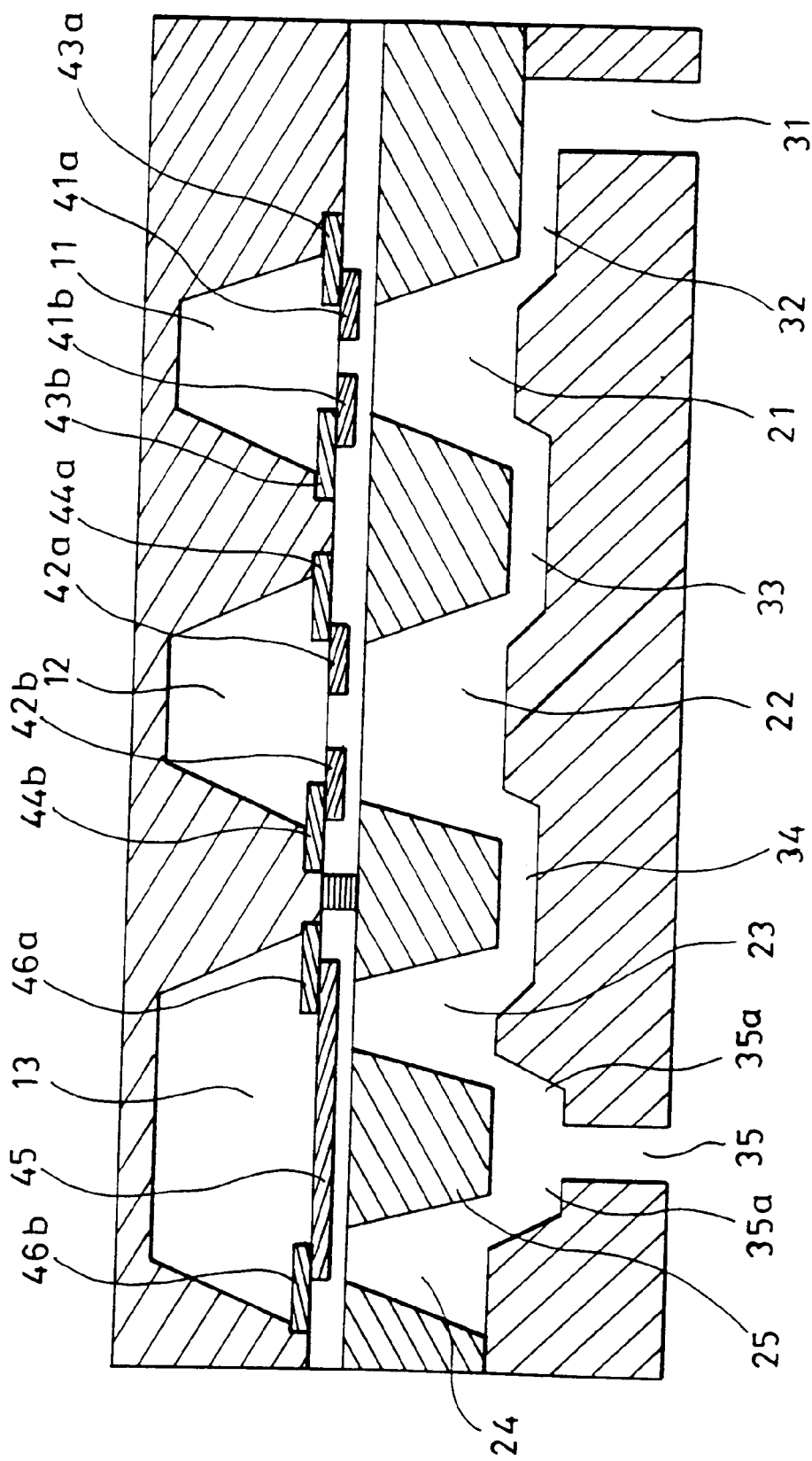
FIG. 3 illustrates the sectional view of the second embodiment of the integrated flow controller module of the invention.

FIG. 3 illustrates the sectional view of the second embodiment of the integrated flow controller module of the invention. In this figure, components that are same in FIG. 1 are labeled with same numbers. As shown in this figure, the flow controller module of this embodiment comprises a microvalve operating in a normally open mode. In other words, recessions 35a, 35a are provided in lower layer 3 at areas adjacent to mesa structure 25 such that mesa structure 25 does not butt against lower layer 3 under the initial status. When a voltage is applied to electrodes 46, 46, EPI layer 21 will generate a deformation and moves mesa structure 25 downwards. The sectional area of the opening between mesa structure 25 and lower layer 3 will vary according to the voltage applied, such that the velocity of the fluid flow may be controlled.

The preparation and the operation of the integrated micro flow controller module of this embodiment are similar to that of embodiment 1. Detailed description thereof is then omitted.

EMBODIMENT 3

Figure 4:
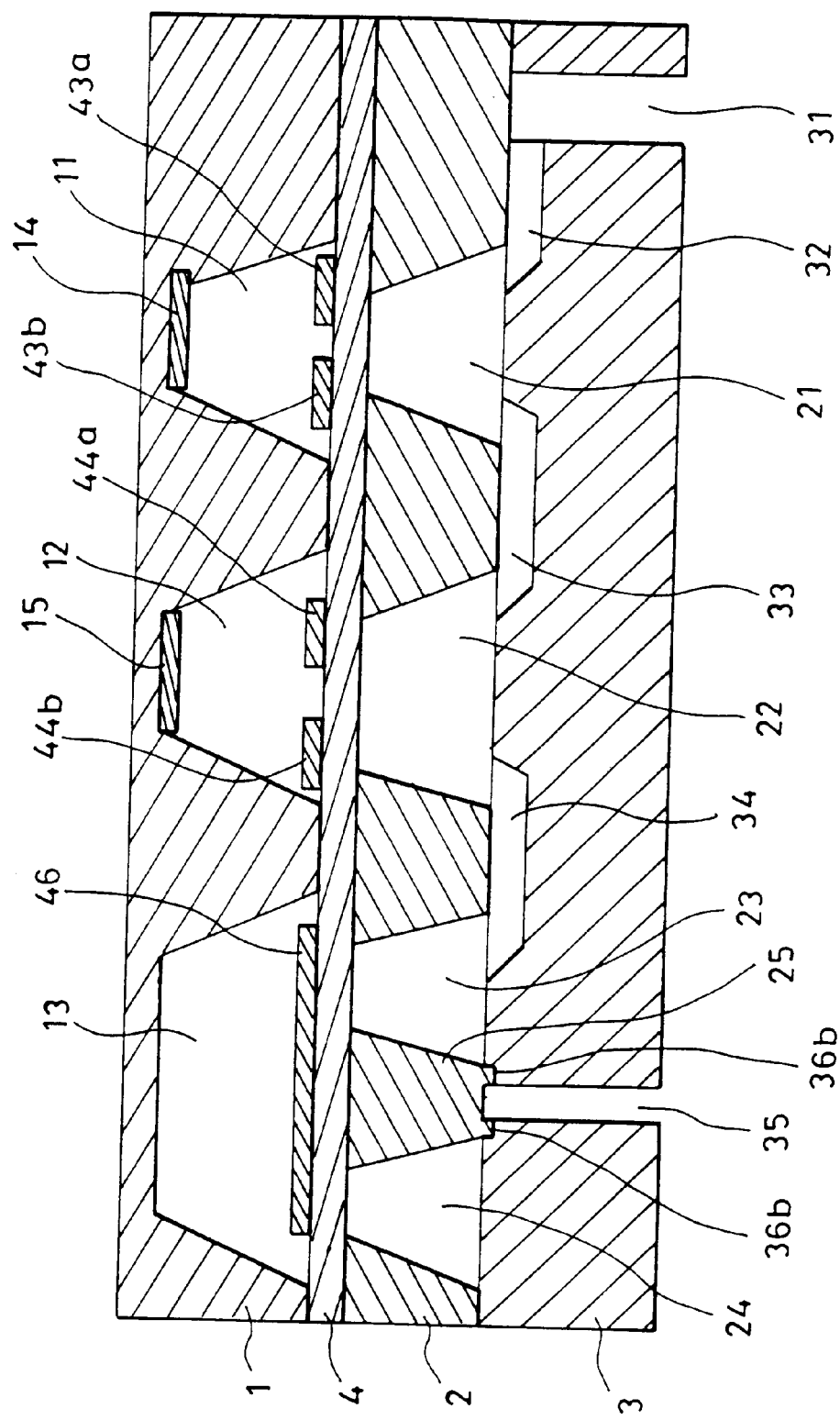
FIG. 4 illustrates the sectional view of the third embodiment of the integrated flow controller module of the invention.

FIG. 4 illustrates the sectional view of the third embodiment of the integrated flow controller module of the invention. In this figure, components that are same in FIG. 1 are labeled with same numbers. As shown in this figure, the flow controller module of this embodiment has a substantially similar structure of that of embodiments 1 and 2, except that no impurity layers are formed on the EPI layer 4, under pressure cavities 11 and 12. Instead, at the ceilings of the pressure cavities 11 and 12 provided are electrodes 14 and 15 respectively. Electrodes 14 and 43a, 43b and electrodes 15 and 44a, 44b jointly and respectively function as capacitors.

When a fluid is introduced into orifices 21 and 22, pressure of the fluid forces EPI layer 4 to deform, such that capacitance of the capacitors varies due to variations in distance between electrodes consisting the capacitors. If EPI layer 4 is connected to P pole, and electrodes 14 and 15 to N pole, capacitance of the capacitors may be measured and converted into velocity of the flow by a microprocessor (not shown). Conversions from capacitance into velocity may be performed according to any known formula. The microprocessor then controls the operations of the microvalve in a way similar to that of the above-mentioned embodiments. Description thereof is thus omitted.

As to the preparation of the integrated flow controller module of this embodiment, electrodes 14 and 15 may be formed on the ceilings of the pressure cavities 11 and 12. They may be bonded to the upper layer 1 after pressure cavities 11, 12 and 13 are formed. They may also be bonded to the upper layer 1 before a sacrificial layer (not shown) is formed on upper layer 1. Suited materials for electrodes 14 and 15 include platinum and other metal or metal alloys.

EMBODIMENT 4

Figure 5:
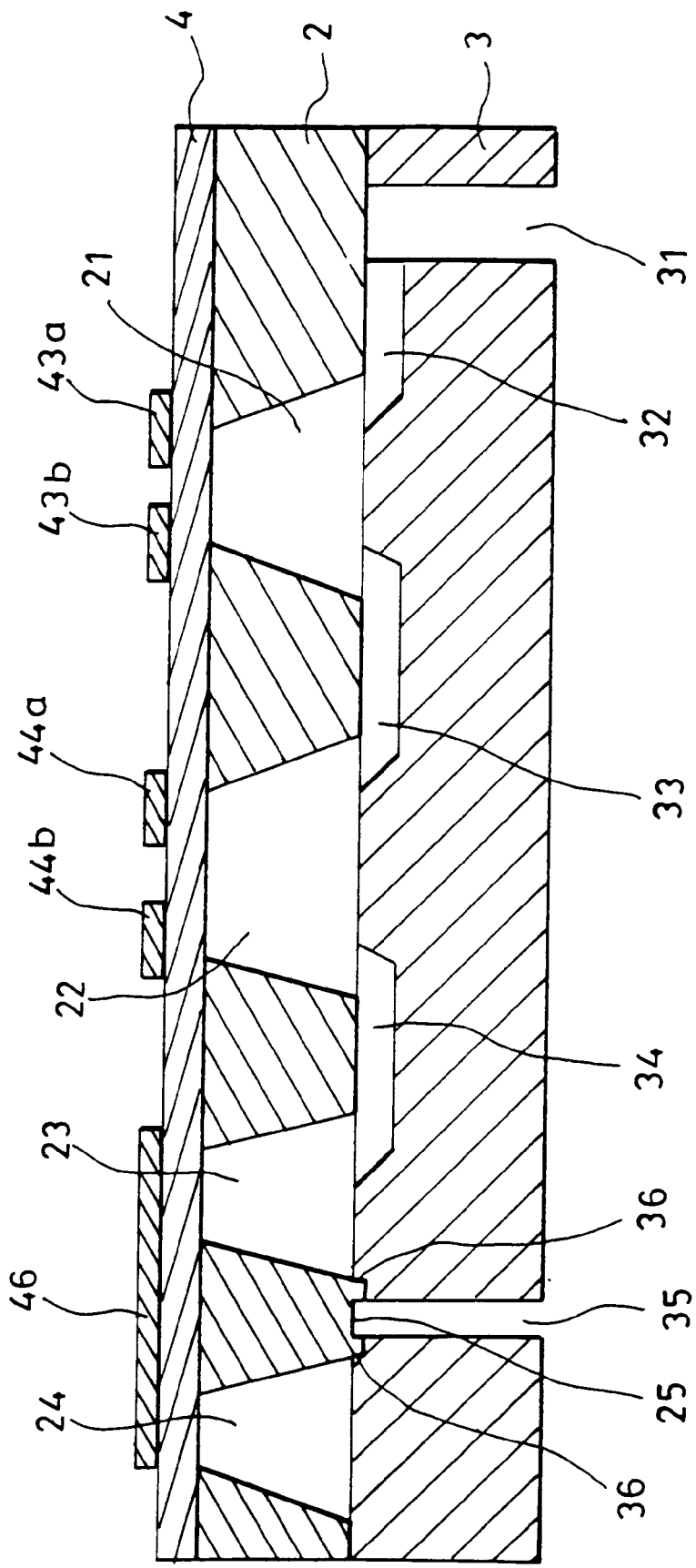
FIG. 5 illustrates the sectional view of the fourth embodiment of the integrated flow controller module of the invention.

FIG. 5 illustrates the sectional view of the fourth embodiment of the integrated flow controller module of the invention. In this figure, components that are same in FIG. 1 are labeled with same numbers. As shown in this figure, the flow controller module of this embodiment is not provided with an upper layer, and thus the pressure cavities. Electrodes 43a, 43b, 44a, 44b and 46 are exposed to the external of the structure. In some embodiments, a coating layer covers these electrodes.

Since no pressure cavities are provided, the applicable velocity of the flow controller module of this embodiment will be limited by the character of the EPI layer 4.

The flow controller module of this embodiment may operate under a normally opened mode or under a normally closed mode. Preparation and operation of the embodiment are similar to that of the preceding embodiments. Description thereof is then omitted.

EMBODIMENT 5

In embodiments 1, 2 and 4, if no microvalve area is provided and outlet 35 is formed under connection channel 34, the assembly may function as a micro flow sensor. Here, the microprocessor (not shown) converts the pressure of the fluid into velocity values and outputs such velocity.

EMBODIMENT 6

In embodiment 3, if no microvalve area is provided and outlet 35 is formed under connection channel 34, the assembly may function as a micro flow sensor. Here, the microprocessor (not shown) converts variations in capacitance of the capacitors into velocity values and outputs such velocity.

EFFECTS OF THE INVENTION

In the integrated flow controller module of this invention, the flow sensor(s), the actively driven microvalve and the microchannel are integrated in one single dice. The module may be prepared in a large quantity under a known semiconductor manufacture process. The module so prepared is compact and easy to prepare. Since the components are not prepared separately and the flow sensors are position directly in the fluid channel, the structure and the manufacture process are further simplified and its volume is further reduced.

As the present invention has been shown and described with reference to preferred embodiments thereof, those skilled in the art will recognize that the above and other changes may be made therein without departing from the spirit and scope of the invention.

What is claimed is:

1. A method for preparing an integrated flow controller module comprising the steps of:

preparing a substrate;

etching said substrate to form a fluid inlet, a fluid outlet and at least one fluid channel section;

forming a middle layer on said substrate;

etching said middle layer to form at least a fluid channel section, at least one fluid stopper and a mesa;

forming an elastic wall layer on said middle layer;

fixing a number of electrodes on said elastic wall layer at positions including a position adjacent to said mesa;

fixing resistors of the same number as the number of said electrodes on said elastic wall layer at positions fixed with said resistors before said resistors are fixed, such that said electrodes overlap at least partially with said resistors, respectively;

forming an upper layer on said elastic wall layer, wherein said upper layer is provided with cavities of the same number as the number of said electrodes; and providing said cavities with electrodes inside said cavities opposite to positions corresponding to said electrodes on said elastic wall layer.

2. The method according to claim 1 wherein said step of forming said upper layer comprises:

forming an upper layer;

forming a number of sacrificial areas on said upper layer to define said cavities;

etching said upper layer to form said cavities; and coating said cavities.

3. The method according to claim 1 wherein said step of forming said upper layer comprises:

forming an upper layer;

etching said upper layer to form said cavities; and bonding said upper layer with said elastic wall layer such that said cavities are positioned on said electrodes respectively.

4. The method according to claim 1 further comprising a step of forming a thermally insulator in said elastic wall layer.

* * * * *